United States Patent
Jindal et al.

(10) Patent No.: US 11,444,774 B2
(45) Date of Patent: Sep. 13, 2022

(54) METHOD AND SYSTEM FOR BIOMETRIC VERIFICATION

(71) Applicant: Tata Consultancy Services Limited, Mumbai (IN)

(72) Inventors: Arun Kumar Jindal, Gurgaon (IN); Vasudha Kumari, Pune (IN); Imtiyazuddin Shaik, Hyderabad (IN); Srinivasa Rao Chalamala, Hyderabad (IN); Rajan Mindigal Alasingara Bhattachar, Bangalore (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 248 days.

(21) Appl. No.: 17/026,380

(22) Filed: Sep. 21, 2020

(65) Prior Publication Data

US 2021/0211290 A1 Jul. 8, 2021

(30) Foreign Application Priority Data

Jan. 8, 2020 (IN) .............................. 202021000861

(51) Int. Cl.
*H04L 9/32* (2006.01)
*H04L 9/08* (2006.01)
*H04L 9/30* (2006.01)
*H04L 9/00* (2022.01)

(52) U.S. Cl.
CPC ............ *H04L 9/3231* (2013.01); *H04L 9/008* (2013.01); *H04L 9/0897* (2013.01); *H04L 9/3006* (2013.01); *H04L 9/3263* (2013.01)

(58) Field of Classification Search
None
See application file for complete search history.

(56) References Cited

U.S. PATENT DOCUMENTS

| | | |
|---|---|---|
| 8,165,352 B1 | 4/2012 | Mohanty et al. |
| 8,542,886 B2 | 9/2013 | Osadchy et al. |
| 8,972,742 B2 | 3/2015 | Troncoso Pastoriza et al. |
| 11,394,552 B2* | 7/2022 | Streit ................. G06N 3/04 |

(Continued)

OTHER PUBLICATIONS

Zhang, Zhilin, "Towards Secure and Practical Query Services over Encrypted Data in Cloud Computing", PHD submission, 2019, 109 total pages. (Year: 2019).*

(Continued)

*Primary Examiner* — Michael Pyzocha
(74) *Attorney, Agent, or Firm* — Finnegan, Henderson, Farabow, Garrett & Dunner, LLP

(57) ABSTRACT

This disclosure relates generally to a method and system for biometric verification. Conventional biometric verification method and system performs one or more computations in non-encrypted domain, thereby leading to security threats. The disclosed method includes performing computations such as enrollment and verification feature vector computation, dimensionality reduction of said feature vectors, and comparison of dimensionally reduced encrypted feature vectors to obtain matching scores indicating the extent of match therebetween between in encrypted domain using fully homomorphic encryption, thereby leading to secure biometric verification.

20 Claims, 4 Drawing Sheets

(56) References Cited

U.S. PATENT DOCUMENTS

| | | | |
|---|---|---|---|
| 2011/0091113 A1* | 4/2011 | Ito | G06T 3/0093 |
| | | | 382/197 |
| 2013/0148868 A1* | 6/2013 | Troncoso Pastoriza | |
| | | | H04L 9/3093 |
| | | | 382/118 |
| 2014/0325230 A1* | 10/2014 | Sy | G06F 21/32 |
| | | | 713/171 |
| 2019/0386814 A1* | 12/2019 | Ahmed | H04L 9/008 |
| 2019/0394039 A1* | 12/2019 | Higo | H04L 9/3231 |
| 2020/0034740 A1* | 1/2020 | Yang | G06K 9/6247 |
| 2020/0143066 A1* | 5/2020 | Klontz | H04L 9/0656 |
| 2020/0228340 A1* | 7/2020 | Blackhurst | H04L 9/3231 |
| 2020/0228341 A1* | 7/2020 | Mohassel | H04L 9/30 |
| 2022/0050999 A1* | 2/2022 | Zheng | H04L 9/0825 |
| 2022/0085971 A1* | 3/2022 | Zhang | H04L 9/008 |

OTHER PUBLICATIONS

Catak, Ferhat Ozgur et al., "A Privacy-Preserving Fully Homomorphic Encryption and Parallel Computation Based Biometric Data Matching", Preprints, Jul. 27, 2020, pp. 1-16. (Year: 2020).*

Boddeti, Vishnu Naresh, "Secure Face Matching Using Fully Homomorphic Encryption", arXiv:1805.00577, Jul. 13, 2018, 10 pages. (Year: 2018).*

Marta Gomez-Barreroa et al., "Multi-biometric template protection based on Homomorphic Encryption," Pattern Recognition, 2017, EISEVIER, http://atvs.ii.uam.es/atvs/files/2017_PR_multiBtpHE_marta.pdf.

Arun Kumar Jindal et al., "Face Template Protection using Deep Convolutional Neural Network," Conference on Computer Vision and Pattern Recognition Workshops (CVPRW), 2018, IEEE, https://openaccess.thecvf_com/content_cvpr_2018_workshops/papers/w11/Jindal_Face_Template_Protection_CVPR_2018_paper.pdf.

P. Punithavathi et al., "Dynamic sectored random projection for cancelable iris template," International Conference on Advances in Computing, Communications and Informatics (ICACCI), Sep. 2016, IEEE, https://researchgate_net/publicaton/325568015_Dynamic_sectored_random_projection-for_cancelable_iris_template/link/5b162f7ea6fdcc31bbf53b38/download.

Cagatay Karabat et al., "THRIVE: threshold homomorphic encryption based secure and privacy preserving biometric verification system," Journal on Advances in Signal Processing, Sep. 2014, ARXIV, https://www.researchgate.net/publicaton/266261762_THRIVE_Threshold_Homomorphic_encryption_based_secure and privacy_preserving_biometric_VErification_system/link/558a693d08aeb674bb60ff70/download.

* cited by examiner

METHOD AND SYSTEM FOR BIOMETRIC VERIFICATION

PRIORITY CLAIM

This U.S. patent application claims priority under 35 U.S.C. § 119 to: India Application No. 202021000861, filed on Jan. 8, 2020. The entire contents of the aforementioned application are incorporated herein by reference.

TECHNICAL FIELD

The disclosure herein generally relates to biometric verification, and, more particularly, to system and method for biometric verification using fully homomorphic encryption.

BACKGROUND

With the growth of the Internet and communication technology, more and more information is being exchanged over the Internet. The information includes, but is not limited to, services, applications, and content. Said information includes personal as well as public information associated with a user. In the scenarios where the information communicated over the Internet is personal information, additional care has to be taken for maintaining trustworthiness of users accessing the information and user devices utilized for communication. For communicating the information in a secure environment, various authentication schemes are utilized for authentication of the users accessing such information.

One such authentication scheme utilizes biometric verification of the user. Examples of such biometrics includes, but are not limited to, face, iris, fingerprint, and so on. The growing use of biometrics has, however, led to rising concerns about the security and privacy of biometric data (also referred to as biometric template) since it is unique to each individual and cannot be replaced.

SUMMARY

Embodiments of the present disclosure present technological improvements as solutions to one or more of the above-mentioned technical problems recognized by the inventors in conventional systems. For example, in one embodiment, a processor-implemented method for biometric verification is provided. The method includes acquiring, via one or more hardware processors, a first biometric sample, the first biometric sample comprising at least a portion of a first high-resolution image of a biometric modality of the user. Further, the method includes performing, via the one or more hardware processors, data augmentation on the at least portion of the first high resolution image to obtain a set of augmented image portions of the first biometric sample. Furthermore, the method includes obtaining a set of first feature vectors corresponding to the set of augmented image portions and the first high resolution image, via the one or more hardware processors. Also, the method includes encrypting, using Fully Homomorphic Encryption, each first feature vector of the set of first feature vectors using a public key stored at a first computation device to obtain a set of first encrypted feature vectors, via the one or more hardware processors. Moreover, the method includes obtaining, via the one or more hardware processors, a set of encrypted reduced dimensionality first feature vectors corresponding to the set of encrypted first feature vectors, wherein an encrypted reduced dimensionality first feature vector from amongst the set of encrypted reduced dimensionality first feature vectors corresponding to an encrypted first feature vector from amongst the set of encrypted first feature vector is obtained by performing a homomorphic operation of the encrypted feature vector with an encrypted random projection matrix encrypted using Fully Homomorphic Encryption, and wherein the encrypted random projection matrix is pre-assigned to the user, and is encrypted using the public key. Still further, the method includes sharing, via the one or more hardware processors, the set of encrypted reduced dimensionality first feature vectors with a second computation device, wherein the set of encrypted reduced dimensionality feature vectors are compared with a pre-stored homomorphic encrypted second feature vector corresponding to a second biometric sample associated with the user to obtain a set of matching scores, wherein a matching score between an encrypted reduced dimensionality first feature vector of the set of encrypted reduced dimensionality first feature vectors and the homomorphic encrypted second feature vector is indicative of an extent of matching between the first biometric sample and the second biometric sample, and wherein each matching score of the set of encrypted matching scores is encrypted via homomorphic encryption using the public key. Also, the method includes receiving, from the second device, the set of encrypted matching scores and decrypting the set of encrypted matching scores using a private key, via the one or more hardware processors. The method further includes verifying the user based on a comparison of the set of matching scores with a predetermined threshold score, via the one or more hardware processors.

In another aspect, a system for biometric verification is provided. The system includes one or more memories; and one or more hardware processors, the one or more memories coupled to the one or more hardware processors, wherein the one or more hardware processors are configured to execute programmed instructions in a trusted execution environment (TEE), the programmed instructions stored in the one or more memories, to acquire a first biometric sample, the first biometric sample comprising at least a portion of a first high-resolution image of a biometric modality of the user. Further, the one or more hardware processors are configured to execute programmed instructions to perform data augmentation on the at least portion of the first high resolution image to obtain a set of augmented image portions of the first biometric sample. Furthermore, the one or more hardware processors are configured to execute programmed instructions obtain a set of first feature vectors corresponding to the set of augmented image portions and the first high resolution image. Moreover, the one or more hardware processors are configured to execute programmed instructions to encrypt, using Fully Homomorphic Encryption, each first feature vector of the set of first feature vectors using a public key stored at a first computation device to obtain a set of first encrypted feature vectors. Also, the one or more hardware processors are configured to execute programmed instructions to obtain a set of encrypted reduced dimensionality first feature vectors corresponding to the set of encrypted first feature vectors, wherein an encrypted reduced dimensionality first feature vector from amongst the set of encrypted reduced dimensionality first feature vectors corresponding to an encrypted first feature vector from amongst the set of encrypted first feature vector is obtained by performing a homomorphic operation of the encrypted feature vector with an encrypted random projection matrix encrypted using Fully Homomorphic Encryption, and wherein the encrypted random projection matrix is and pre-assigned to the user and is encrypted using the public key. Also, the one or more hardware processors are configured to execute programmed instructions to share the set of encrypted reduced dimensionality first feature vectors with a second computation device, wherein the set of encrypted reduced dimensionality feature vectors are compared with a pre-stored homomorphic encrypted second feature vector corresponding to a second biometric sample associated with the user to obtain a set of matching scores, wherein a matching score between an encrypted reduced dimensionality first feature vector of the set of encrypted reduced dimensionality first feature vectors and the homomorphic encrypted second feature vector is indicative of an extent of matching between the first biometric sample and the second biometric sample, and wherein each matching score of the set of encrypted matching scores is encrypted via homomorphic encryption using the public key. Also, the one or more hardware processors are configured to execute programmed instructions to receive, from the second device, the set of encrypted matching scores and decrypting the set of encrypted matching scores using a private key. The one or more hardware processors are further configured to execute programmed instructions to verify the user based on a comparison of the set of matching scores with a predetermined threshold score.

In yet another aspect, a non-transitory computer readable medium for a method for biometric verification is provided. The method includes acquiring, via one or more hardware processors, a first biometric sample, the first biometric sample comprising at least a portion of a first high-resolution image of a biometric modality of the user. Further, the method includes performing, via the one or more hardware processors, data augmentation on the at least portion of the first high resolution image to obtain a set of augmented image portions of the first biometric sample. Furthermore, the method includes obtaining a set of first feature vectors corresponding to the set of augmented image portions, via the one or more hardware processors. Also, the method includes encrypting, using Fully Homomorphic Encryption, each first feature vector of the set of first feature vectors using a public key stored at a first computation device to obtain a set of first encrypted feature vectors, via the one or more hardware processors. Moreover, the method includes obtaining, via the one or more hardware processors, a set of encrypted reduced dimensionality first feature vectors corresponding to the set of encrypted first feature vectors, wherein an encrypted reduced dimensionality first feature vector from amongst the set of encrypted reduced dimensionality first feature vectors corresponding to an encrypted first feature vector from amongst the set of encrypted first feature vector is obtained by performing a homomorphic operation of the encrypted feature vector with an encrypted random projection matrix encrypted using Fully Homomorphic Encryption, and wherein the encrypted random projection matrix is pre-assigned to the user and is encrypted using the public key. Still further, the method includes sharing, via the one or more hardware processors, the set of encrypted reduced dimensionality first feature vectors with a second computation device, wherein the set of encrypted reduced dimensionality feature vectors are compared with a pre-stored homomorphic encrypted second feature vector corresponding to a second biometric sample associated with the user to obtain a set of matching scores, wherein a matching score between an encrypted reduced dimensionality first feature vector of the set of encrypted reduced dimensionality first feature vectors and the homomorphic encrypted second feature vector is indicative of an extent of matching between the first biometric sample and the second biometric sample, and wherein each matching score of the set of encrypted matching scores is encrypted via homomorphic encryption using the public key. Also, the method includes receiving, from the second device, the set of encrypted matching scores and decrypting the set of encrypted matching scores using a private key, via the one or more hardware processors. The method further includes verifying the user based on a comparison of the set of matching scores with a predetermined threshold score, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
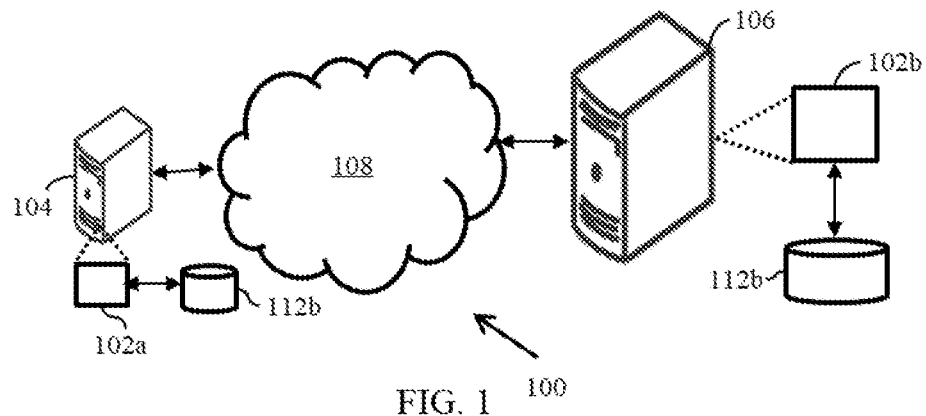
FIG. 1 illustrates an example network implementation of a system for biometric verification in accordance with an example embodiment of the present disclosure.

The term 'biometrics' is defined as automated recognition of individuals based on their unique behavioral and biological characteristics (ISO/IEC JTC1 SC37). A typical biometric system obtains said unique behavioral and physical characteristics by acquiring the user's biometric trait (such as fingerprints, iris, face, voice, gait, and so on) via one or more sensors. Acquired biometric data is processed to extract the salient information (feature set). During enrollment phase, the extracted feature set is stored in the database as a template. During verification, a matcher module accepts two biometric templates, namely a stored template and a query template as inputs and outputs a matching score indicating the similarity between the two templates. If the matching score exceeds a certain threshold the user is verified successfully.

A secure biometric system should not only accurately authenticate the user (less false rejects) and deny access to imposters (less false accepts), it should also store the templates in a secure manner. This is important because unlike credit cards and passwords which when compromised can be revoked and reissued, biometric data (template) is permanently associated with the user and cannot be replaced. If a biometric template is exposed once, it is lost forever. Further, a compromised biometric template can be misused for cross-matching across databases. Therefore, biometric template protection is an important issue in designing a secure biometric system.

The conventional biometric verification systems pose a challenge with respect to intra-user variability that is caused by changes in user's pose, illumination, expression, and so on. Moreover, such systems assume that the input to the system is an image of, for example, a face in which the positions of the eyes and lips are known. However, for many real-world applications, such assumptions are unrealistic and impractical. Certain known biometric verification system utilizes Partial Homomorphic Encryption with support for binarized data for encryption purposes. Such systems require quantification of feature vectors. The quantization of feature vectors leads to loss of information (or lossy computations) thereby leading to low matching performance during verification of the biometric information.

Typical biometric verifications systems perform computations in non-encrypted domain. For example, in such conventional system, a feature vector associated with the biometric sample is mapped to a randomly generated binary code. The cryptographic hash of the binary code represents the protected biometric template. Moreover, in another known system, similarity computation between the stored template and the query biometric templates is performed in an unencrypted domain. Since said computations are performed in unencrypted domain, such computations pose, both security and privacy concern for the verification process Various embodiments disclosed herein provide method and system for biometric verification in a secure manner using fully homomorphic encryption. For example, in various embodiments, the disclosed system utilizes homomorphic encryption computations for encrypting the feature vectors of the stored biometric template and the query biometric template. Moreover, the disclosed system performs dimensionality reduction in the encrypted domain using homomorphic encryption. In addition, the disclosed system makes use of an encrypted random projection matrix as a security feature. An important contribution of the disclosed embodiments is that unlike conventional systems, the disclosed embodiments do not require quantification of feature vectors. Instead, the disclosed embodiments perform computations with real valued feature vectors, thereby precluding need for lossy computations performed in conventional systems.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 4, where similar reference characters denote corresponding features consistently throughout the figures, there are shown preferred embodiments and these embodiments are described in the context of the following exemplary system and/or method.

FIG. 1 illustrates a network implementation 100 of a system (for example a system 102a and/or a system 102b) for biometric verification, in accordance with example embodiments. In one embodiment, the network implementation 100 includes at least one first device, for example a first device 104 and at least one second device, for example a second device 106. In an embodiment, the first device 104 may be a client device. In an embodiment, the second device 106 may be a server device. Herein, it will be understood that the system, for example the system 102a/102b may be embodied in or communicatively coupled to the first device 104 and the second device 106. For example, as illustrated in FIG. 1, the system 102a is shown to be communicatively coupled to the first device 104 and the system 102b is shown to be communicatively coupled to the second device 106. Alternatively, one or both of the systems 102a, 102b can be implemented in a computation device outside of the first device and the second device respectively, and communicatively couple thereto. Hereinafter, the systems 102a, 102b may be collectively referred to as a system 102.

The first device 104 and the second device 106 may be communicably coupled to each other through a communication network 108. It will be noted herein that the number of devices and/or networks, illustrated in FIG. 1, is provided for explanatory purposes only. In practice or some example scenarios, there may be additional or fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. Devices and/or networks of environment 100 may interconnect via wired connections, wireless connections (laser, infrared, RF, optical), or a combination of wired and wireless connections over the communication network 108.

The communication network 108 may be a wireless network, wired network or a combination thereof. The communication network 108 can be implemented as one of the different types of networks, such as intranet, local area network (LAN), wide area network (WAN), the internet, a metropolitan area network (MAN), an ad hoc network, an intranet, a fiber optic-based network, and/or a combination of these or other types of networks. Additionally or alternatively, the communication network 108 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further the communication network 108 may include a variety of network devices, including routers, bridges, servers, computing devices, storage devices, etc.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment.

The first device 104 may include any computation or communication device that is capable of communicating via the communication network 108. For example, the client device may be a computation device that may be capable of facilitating a user access to a service requiring user biometric verification. In another example, the client device 104 may be implemented in a variety of communication devices such as a laptop computer, a desktop computer, a notebook, a workstation, a mobile phone, a personal digital assistant (PDA), and so on. The client device is configured to enroll and verify a user, for example, for accessing a service or premises. For example, in an enrollment phase, the client device may allow the user to enroll by using encrypted biometric information thereof. Post enrolment, i.e. during verification phase, the user's assess can be verified using the enrolled encrypted biometric information.

The second device 104 may include one or more server devices, or other types of computation and communication devices that may receive encrypted biometric information during the enrollment phase and the verification phase from the client device. The sever may determine an extent of match between the encrypted biometric information stored during the enrollment phase with the encrypted biometric information received during the verification phase to compute matching scores. The server shares said matching scores with the client device for biometric verification of the user at the client device.

In an embodiment, the system, for example the systems 102a, 102b may be implemented in a computing device, for instance the computing devices 104, 106 such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102a, 102b may be coupled to a data repository, for example, a repository 112a, 112b respectively (hereinafter referred to as a repository or database 112). The repository 112 may store data processed, received, and generated by the system 102. In an alternate embodiment, the system 102 may embody the data repository 112. The components and functionalities of the system 102 are described further in detail with reference to FIGS. 2-4.

Figure 2A:
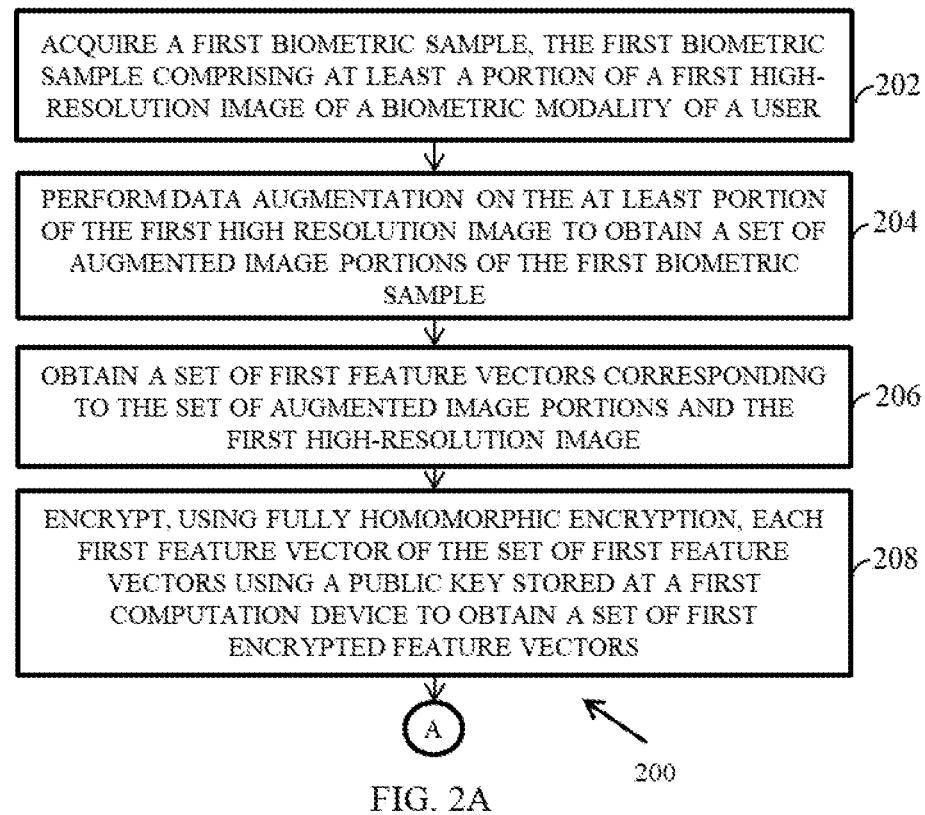
FIG. 2A illustrates a first portion of a flow diagram for a method for biometric verification in accordance with an example embodiment of the present disclosure.
Figure 2B:
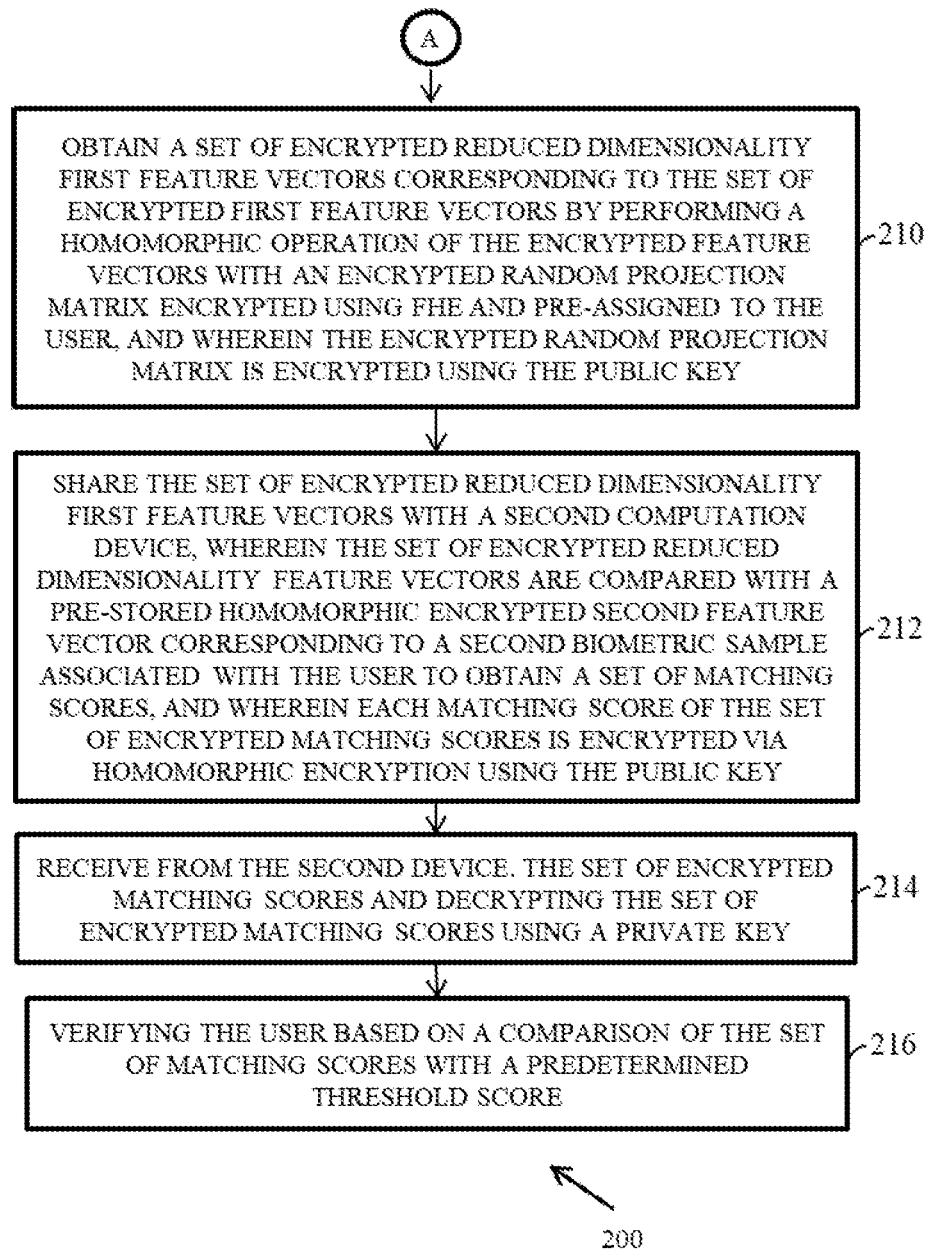
FIG. 2B illustrates a second portion of the flow diagram for a method for biometric verification in accordance with an example embodiment of the present disclosure.
Figure 3:
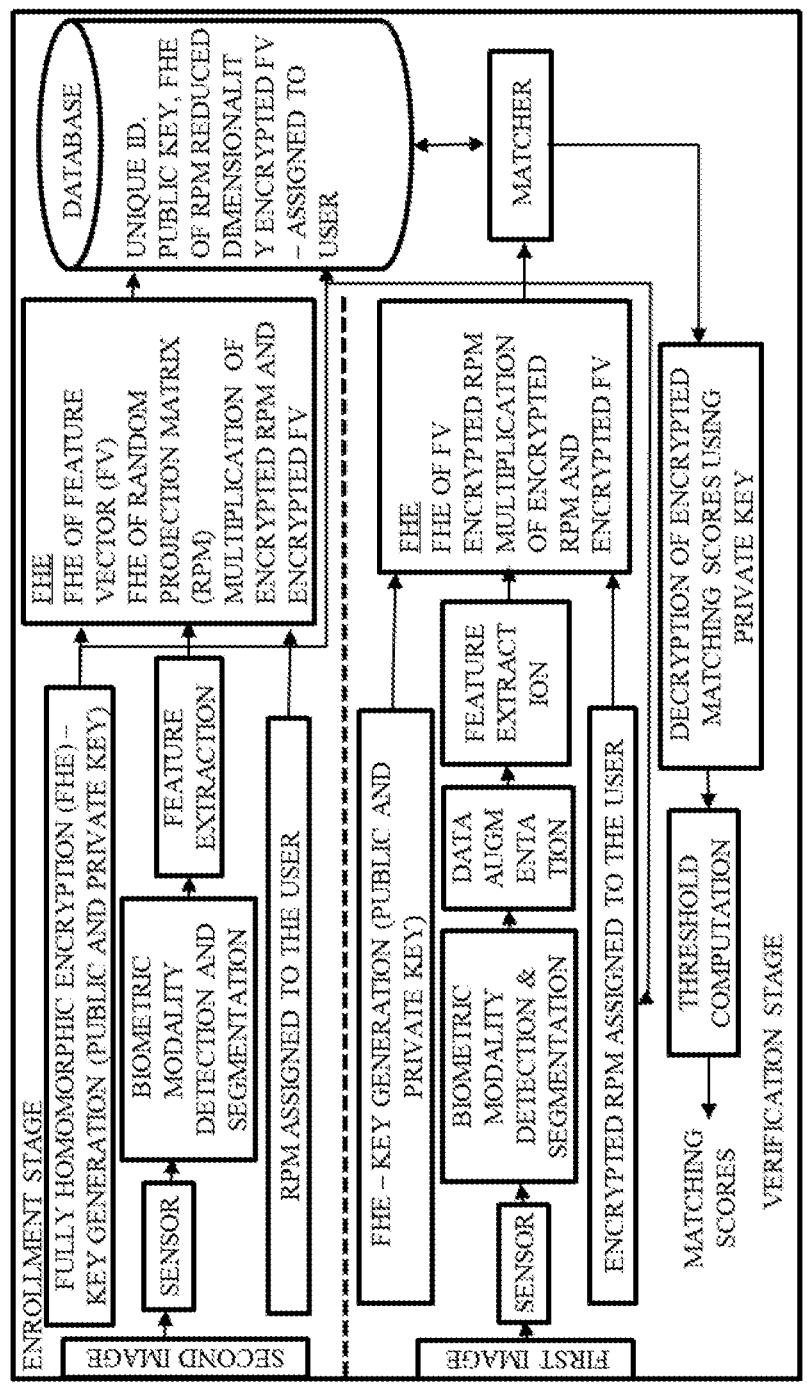
FIG. 3 illustrates an example process flow for a method of biometric verification in an example embodiment of the present disclosure.
Figure 4:
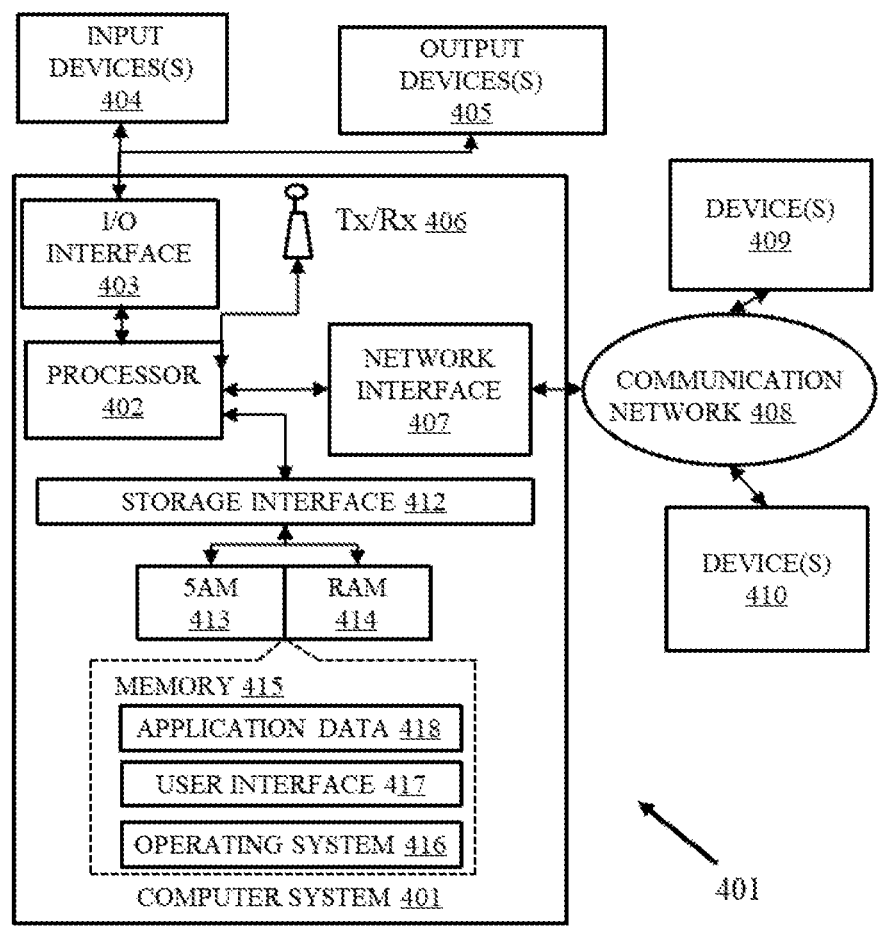
FIG. 4 illustrates a block diagram of an exemplary computer system for implementing embodiments consistent with the present disclosure.

Referring collectively to FIGS. 2-4, components and functionalities of the system 102 for biometric verification are described in accordance with an example embodiment. For example, FIG. 2 illustrates a flow diagram for a method for biometric verification in accordance with an example embodiment. FIG. 3 illustrates a process flow diagram of a system for biometric verification, in accordance with an example embodiment. FIG. 4 illustrates a block diagram of an exemplary computer system for implementing embodiments consistent with the present disclosure.

For the purpose of biometric verification, the proposed method includes two phases, namely an enrollment phase and a verification phase. During each of the enrollment and the verification phases, one or more biometric samples are acquired from the user at the first device. Examples of such biometric samples may include, but are not limited to, images of user's face, retina, fingerprints, palm print, and finger knuckle.

Hereinafter, the biometric sample acquired during the verification phase may be referred to as a first biometric sample and the biometric sample acquired during the enrolment phase may be termed as second biometric sample.

The first biometric sample and the second biometric sample may be obtained by capturing a high-resolution image of the user and thereafter preprocessing the biometric sample from the captured high-resolution image. Hereinafter, the high-resolution image acquired during the verification phase may be referred to as a first high-resolution image and the high-resolution image acquired during the enrolment phase may be termed as second high-resolution image. In various embodiments, the method includes capturing one shot enrollment such that a single image of the user's biometric modality captured and used for enrollment. The single image may be a high-resolution image that may enable capturing of biometric details for the purpose of enrolment. In an embodiment, the client device may include an image sensor for retrieving the high-resolution image of the user in single shot enrolment.

The high-resolution image, for example, the second high-resolution image, captured during the enrolment phase is preprocessed to detect the biometric modality in said image. In an embodiment, for acquiring the second biometric sample, the system 102 may first retrieve the biometric modality in the captured high-resolution image and segment at least a portion of the biometric modality from it to obtain a segmented image portion. In an embodiment, the segmented image portion may be represented by "x*x" image. Herein, a system, for example, the system 102a may facilitate in detecting the biometric modality in the captured high-resolution image. For instance, the second high-resolution image may include an upper torso of the user including users head, face, and shoulders. However, for the purpose of the biometric verification only the face image or the eye image may be required. In such a scenario, during the pre-processing stage, the second biometric sample of the user containing the biometric modality such as the face or the iris may be acquired from the second high-resolution image by first detecting the second biometric sample in the second high-resolution image and thereafter segmenting the detected iris from the second high-resolution image. In an embodiment, a detector model, for example, a Multi-Task Cascaded Convolutional Networks (MTCNN) may be utilized for detecting the second biometric sample from the captured second high-resolution image.

Upon acquiring the second biometric sample, a second feature vector corresponding to the at least the portion of the second high-resolution image is obtained. For example, the segmented "x*x" image may be given as an input to a feature detection model. The feature detection model may be a pre-trained model for feature vector extraction. The feature detection model may output a discriminative feature vector, i.e. the second feature vector corresponding to the segmented image of dimension "x*x". Herein the discriminative feature vector may capture the uniqueness/unique features present in the portion of the second high-resolution image. The second feature vector may be encrypted using a public key stored at the first computation device to obtain an encrypted second feature vector. Herein, a key pair having a public key and a private key may be generated at the client device. Said generated key pair may be utilized during the biometric verification of the user.

In an embodiment, a homomorphic operation (for example, a multiplication operation) of the encrypted second feature vector with an encrypted random projection matrix encrypted using Fully Homomorphic Encryption is performed to obtain an encrypted reduced dimensionality second feature vector corresponding to the encrypted second feature vector. Since the feature vector is encrypted using Fully Homomorphic Encryption (FHE) which is computationally intensive, therefore dimensionality reduction is of prime importance. In an embodiment, the dimensionality of the encrypted second feature vector may be reduced by using an encrypted random project matrix pre-assigned to the user. The random projection matrix may be encrypted using a Fully Homomorphic Encryption. In an example, a homomorphic operation of the encrypted second feature vector with an encrypted random projection matrix encrypted using Fully Homomorphic Encryption is performed to obtain an encrypted reduced dimensionality second feature vector. In an embodiment, the encrypted random projection matrix is encrypted using the public key of key pair assigned to the user. Herein, it will be understood that the random projection matrix is independent of the user and the user's biometric modality. The random projection matrix serves primarily two purposes. Firstly, the random projection matrix reduces the dimensionality of the feature vector. Secondly, the random projection matrix may act as a cancellable transform and thus provides an additional security layer. In case the user's encrypted feature vector stored on the server database is compromised, the user can generate new key pair (using the key generation) and can also generate a new random projection matrix. The random projection matrix of dimension 'k*d' is used to project the original 'd' dimensional data to a 'k' dimensional (k<<d) subspace through the origin.

In an embodiment, the encrypted reduced dimensionality second feature vector is shared with the second computation device, for example the server device. In an embodiment, the reduced dimensionality second feature vector along with a user identity label (for example, a Unique ID assigned to the user), the public key assigned to the user and the encrypted random projection matrix may be stored on the server database, for example the repository 112b (FIG. 1).

During the verification phase, the first biometric sample having at least a portion of the first high-resolution image of the biometric modality of the user is acquired at 202. As previously discussed, the first biometric sample may be obtained by taking a single high-resolution image of the user and thereafter segmenting the image portion having the biometric modality from the high-resolution image. The segmented image is represented by "x*x" image.

Herein, since a one-shot enrollment is performed for capturing the first high resolution image, where only one face image of the user is used for enrollment, a data augmentation is performed on the second biometric sample image to increase the number of samples per user. An increased number of samples per user facilitates in capturing the intra-user variations thereby leading to high matching performance. The data augmentation may be performed on the at least portion of the first high resolution image using, for example, an image data generator model to obtain a set of augmented image portions of the first biometric sample. During data augmentation, various operations such as horizontal flip, zoom, re-scaling, changing the shear angle, rotation to generate a set of augmented image portions at 204.

In Zoom operation, the image may be randomly zoomed-in within a certain pre-defined range. The image may be subjected to horizontal Shifts, wherein randomly selected positive and negative horizontal shifts within a certain pre-defined range and the pixel values at the end of the image are duplicated to fill in the empty part of the image created by the shift. Additionally or alternatively the image may be subjected to vertical Shifts, wherein randomly selected positive and negative vertical shifts within a certain pre-defined range at the end of the image are duplicated to fill in the empty part of the image created by the vertical shift. The image further be subjected to horizontal flips. In rotation operation, the image may be randomly rotated in the image clockwise within the certain pre-defined rotation range argument. The image brightness (darkening and brightening) may be also be changed within a certain pre-defined range for the purpose of data augmentation. In an example scenario, for each augmented image of size x*x, all possible image crops of size y*y may be extracted, thereby yielding a total of (x−y+1)*(x−y+1) image crops. The image crops may then be resized back to y*y. Data augmentation yields a set of augmented image portions having a total of n*(x−y+1)*(x−y+1) image portion corresponding to the first biometric sample.

Upon acquiring the set of augmented image portions, a set of first feature vectors corresponding to the set of augmented image portions of the first high-resolution image is obtained at 206. For example, the segmented "x*x" image portion may be given as an input to a feature detection model. The feature detection model may be a pre-trained model for feature vector extraction. The feature detection model may output a discriminative feature vector, i.e. the first feature vector corresponding to the segmented image of dimension "x*x". Each first feature vector of the set of first feature vectors may be encrypted using a public key stored at the first computation device to obtain a set of encrypted first feature vectors at 208.

Each first feature vector of the set of first feature vectors is encrypted by Fully Homomorphic Encryption using the public key stored at the first computation device to obtain a set of first encrypted feature vectors at 210. In an embodiment, a homomorphic operation of the encrypted first feature vector with an encrypted random projection matrix encrypted using Fully Homomorphic Encryption is performed to obtain the set of encrypted reduced dimensionality first feature vector corresponding to the set of encrypted first feature vectors. Since the feature vector is encrypted using Fully Homomorphic Encryption (FHE) which is computationally intensive, therefore dimensionality reduction is of prime importance. In an embodiment, the dimensionality of the encrypted first feature vector may be reduced by using an encrypted random project matrix pre-assigned to the user. The random projection matrix may be encrypted using a Fully Homomorphic Encryption. In an example, a homomorphic operation of the encrypted first feature vector with an encrypted random projection matrix encrypted using Fully Homomorphic Encryption is performed to obtain the set of encrypted reduced dimensionality second feature vectors. In an embodiment, the encrypted random projection matrix is encrypted using the public key of key pair assigned to the user.

In an embodiment, the encrypted reduced dimensionality first feature vector is shared with the second computation device, for example the server device at 212. In an embodiment, the set of reduced dimensionality first feature vectors along with the user identity label (for example, a Unique ID assigned to the user), the public key assigned to the user and the encrypted random projection matrix may be stored on the server database, for example the repository 112b.

The set of encrypted reduced dimensionality feature vectors having a total of n*(x−y+1)*(x−y+1) feature vectors (corresponding to the unique ID associated with the user) are compared with the pre-stored homomorphic encrypted second feature vector (obtained during the enrolment phase) corresponding to a second biometric sample associated with the user to obtain a set of matching scores at the second device 106 (FIG. 1). The matching score between an encrypted reduced dimensionality first feature vector of the set of encrypted reduced dimensionality first feature vectors and the homomorphic encrypted second feature vector is indicative of an extent of matching between the first biometric sample and the second biometric sample. In an embodiment, each matching score of the set of encrypted matching scores is encrypted via homomorphic encryption using the public key.

For obtaining a similarity score of two biometric feature vectors, namely, the encrypted reduced dimensionality first feature vector and the homomorphic encrypted second feature vector in a privacy preserving manner, both the feature vectors are encrypted. Herein, each of the individual feature vectors are encrypted as one ciphertext, known as packing. Encrypting the individual feature vectors as a whole instead of encrypting each element of the feature vectors as a ciphertext has an advantage that such encryption reduces the memory requirements for encryption. In an embodiment, the matching score between the encrypted reduced dimensionality first feature vector and the homomorphic encrypted second feature vector are obtained by first packing the encrypted reduced dimensionality first feature vector in a first ciphertext and the homomorphic encrypted second feature vector in a second ciphertext, and then multiplying, elementwise, the first ciphertext with the second ciphertext to obtain a resultant vector. Typically, packing does not allow access to individual elements. For example for two vectors [a, b, c] and [1, 2, 3], after packing these vectors in one ciphertext, individual access to a or b or 2/3 is denied. However, operations like multiplication and addition using this packed ciphertext can be performed. So, if above two packed ciphertexts are multiplied, a result vector is obtained as result=[a1, b2, c3] i.e. each component is multiplied element wise. To complete an inner product, each of the components are added as well which should give a1+b2+c3. To do this, library operations called rotations may be utilized. For example, if the result vector is rotated once, it will give [b2, c3, a1]. Similarly, if the result vector is rotated twice, it will give [c3, a1, b2]. Now if both these vectors are added, [a1+b2+c3, a1+b2+c3, a1+b2+c3] is obtained which is the result of inner product.

Herein, it will be understood that here for a feature vector of size n, the vector is rotated n−1 times to complete the inner product. If however n is large, then it will be huge overhead for computation. Hence, in the present embodiments log(n) times rotations are performed to speed up this process. The log(n) times rotations is considerably less and results in much faster computation of inner product. The resultant vector may be rotated log(n) times to obtain a plurality of rotated resultant vectors. A sum of the plurality of rotated resultant vectors is computed to obtain an inner product of the encrypted reduced dimensionality first feature vector and the homomorphic encrypted second feature vector. Said inner product may represent the matching score between the encrypted reduced dimensionality first feature vector and the homomorphic encrypted second feature vector. In an embodiment, a total of $n*(x-y+1)*(x-y+1)$ encrypted matching scores may be sent by the second device 106 to the first device 104.

At 214, the client device may receive the set of encrypted matching scores from the second device, and decrypt the set of encrypted matching scores using the private key. In an embodiment, the user may be verified based on a comparison of the set of matching scores with a predetermined threshold score at 216.

FIG. 3 illustrates a process flow diagram 300 of a method for biometric verification, in accordance with an example embodiment. The illustrated process flow for biometric verification is shown to include an enrollment phase 310 and a verification phase 350. The steps of the enrollment phase and the verification phase have already been explained with reference to FIG. 2, and hence for the brevity of description, same are not repeated herein.

During enrollment phase, the first high-resolution image captured at a sensor, for example an image sensor is of, for example, jpeg type. The captured image had a width of 640 pixels and height of 480 pixels. The captured JPEG image is subjected to a face detection model. The detected face is extracted and resized to a 160*160 image. The 160*160 face image is fed into a pre-trained feature extraction model for faces. The model outputs a 128-dimensional feature vector. A key pair having a public key and a private key were created to set Fully Homomorphic Encryption (FHE) parameters such as number of values that can be packed, plaintext modulus, ciphertext modulus, and so on. A set of users were enrolled, and each user was assigned a Random Projection Matrix (RPM). The random projection matrix of dimension 'k*d' is used to project the original 'd' dimensional data to a 'k' dimensional (k<<d) subspace through the origin. The value of d was selected as 128 and the value of k was selected as 96. For each user, their assigned public key was used to encrypt (Fully Homomorphic Encryption) 128-dimensional feature vector corresponding to image of dimension 160*160. Also, for each user, the assigned public key was used to encrypt (Fully Homomorphic Encryption) the (RPM) assigned to said user. The encrypted random projection matrix was multiplied with the encrypted feature vector, to get the reduced dimensionality encrypted feature vector. The reduced dimensionality encrypted feature vector was sent to the server. The reduced dimensionality encrypted feature vector along with the user identity label (Unique ID assigned to each user), public key of the user and the encrypted random projection matrix was stored on the server database.

During the verification phase, the image (second high-dimensional image) captured at the sensor was of JPEG type. The captured image has width of 640 pixels and height of 480 pixels. The captured JPEG image was subjected to a face detection algorithm. The detected face is extracted and resized to a 160*160 image. Each 160*160 face image was subjected to data augmentation process to generate 6 augmented images, of size 160*160, corresponding to each operation namely zoom, horizontal shift, vertical shift, horizontal flip, rotation and brightness adjustment. Thereafter all possible 157*157 crops of each 160*160 image were taken. Each 157*157 crop were then resized to 160*160. Thus total number of augmented images in 7*(160−157+1)*(160−157+1). Each of the 7*(160−157+1)*(160−157+1) 160*160 face image were fed into a pre-trained feature extraction model for faces. The model outputs a 128 dimensional feature vector corresponding to each of the 7*(160−157+1)*(160−157+1) face images. The public key generated in enrollment phase were used for verification phase. The encrypted Random Projection Matrix (RPM) assigned to the user at the time of enrollment were retrieved. The user's public key was used to encrypt (Fully Homomorphic Encryption) each of the 128 dimensional feature vectors. The total number of encrypted feature vectors computed were 7*(160−157+1)*(160−157+1). Each of the 7*(160−157+1)*(160−157+1) encrypted feature vectors were multiplied with the encrypted random projection matrix assigned to the user at time of enrollment. This gives a total of 7*(160−157+1)*(160−157+1) reduced dimensionality encrypted feature vectors. Each of the 7*(160−157+1)*(160−157+1) reduced dimensionality encrypted feature vectors were compared to the reduced dimensionality encrypted feature vector stored on the server at the time of enrollment corresponding to the unique ID presented at the time of verification. All the encrypted matching scores are sent to the client device. The total number of encrypted matching scores are 7*(160−157+1)*(160−157+1). The encrypted matching scores are decrypted using the user's private key. If the number of matches are greater than a predetermined threshold score, the user is said to be verified.

FIG. 4 is a block diagram of an exemplary computer system 401 for implementing embodiments consistent with the present disclosure. The computer system 401 may be implemented in alone or in combination of components of the system 102 (FIG. 1). Variations of computer system 401 may be used for implementing the devices included in this disclosure. Computer system 401 may comprise a central processing unit ("CPU" or "hardware processor") 402. The hardware processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 402 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Herein, the processor 402 is configured to execute the programmed instructions (described with reference to FIGS. 1-3) for the biometric verification in a trusted execution environment (TEE). A TEE is a secured area within a main processor of a computing device. In various embodiments, the computing device may be one or both of the client device (for example, the device 104 of FIG. 1) and the server device (for example, the device 106 of FIG. 1). The TEE may run in parallel of the operating system, in an isolated environment. The TEE ensures that the programmed instructions the data loaded in the TEE are protected with respect to the confidentiality and integrity.

The TEE's ability to offer safe execution of authorized security software, known as 'trusted applications' (TAs), enables it to provide end-to-end security by protecting the execution of authenticated code, confidentiality, authenticity, privacy, system integrity and data access rights. Comparative to other security environments on the device, the TEE also offers high processing speeds and a large amount of accessible memory. The primary purpose of the isolated execution environment, provided by the TEE, is to protect device and TA assets.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409 and 410. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 416, user interface application 417, user/application data 418 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like. Herein, the memory devices may offer TEE storage for storing the programmed instructions and data pertaining to the biometric verification.

In some embodiments, computer system 401 may store user/application data 418, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provide method and system for biometric verification using fully homomorphic encryption. As the disclosed system utilizes homomorphic encryption computations for encrypting the feature vectors of the stored biometric template and the query biometric template, the encryption performed is secure. Moreover, the disclosed system performs dimensionality reduction in the encrypted domain using homomorphic encryption which adds another layer of protection in encryption. In an embodiment, the disclosed system makes use of an encrypted random projection matrix as a security feature. An important contribution of the disclosed embodiments is that unlike conventional systems, the disclosed embodiments do not require quantification of feature vectors. Instead, the disclosed embodiments perform computations with real valued feature vectors, thereby precluding need for lossy computations performed in conventional systems.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for biometric verification, comprising:
    acquiring, via one or more hardware processors, a first biometric sample, the first biometric sample comprising at least a portion of a first high-resolution image of a biometric modality of a user;
    performing, via the one or more hardware processors, data augmentation on at least the portion of the first high-resolution image to obtain a set of augmented image portions of the first biometric sample;
    obtaining a set of first feature vectors corresponding to the set of augmented image portions and the first high resolution image, via the one or more hardware processors;
    encrypting, using Fully Homomorphic Encryption, each first feature vector of the set of first feature vectors using a public key stored at a first computation device to obtain a set of first encrypted feature vectors, via the one or more hardware processors;
    obtaining, via the one or more hardware processors, a set of encrypted reduced dimensionality first feature vectors corresponding to the set of encrypted first feature vectors, wherein an encrypted reduced dimensionality first feature vector from amongst the set of encrypted reduced dimensionality first feature vectors corresponding to an encrypted first feature vector from amongst the set of encrypted first feature vector is obtained by performing a homomorphic operation of the encrypted feature vector with an encrypted random projection matrix encrypted using Fully Homomorphic Encryption and, and wherein the encrypted random projection matrix is pre-assigned to the user and is encrypted using the public key;

sharing, via the one or more hardware processors, the set of encrypted reduced dimensionality first feature vectors with a second computation device, wherein the set of encrypted reduced dimensionality feature vectors are compared with a pre-stored homomorphic encrypted second feature vector corresponding to a second biometric sample associated with the user to obtain a set of matching scores, wherein a matching score between an encrypted reduced dimensionality first feature vector of the set of encrypted reduced dimensionality first feature vectors and the homomorphic encrypted second feature vector is indicative of an extent of matching between the first biometric sample and the second biometric sample, and wherein each matching score of the set of encrypted matching scores is encrypted via homomorphic encryption using the public key;

receiving, from the second device, the set of encrypted matching scores and decrypting the set of encrypted matching scores using a private key, via the one or more hardware processors; and verifying the user based on a comparison of the set of matching scores with a predetermined threshold score, via the one or more hardware processors.

2. The method of claim 1, wherein acquiring the first biometric sample comprises:

capturing the first high resolution image of at least one biometric modality of the user; and segmenting the first high resolution image to obtain the first biometric sample.

3. The method of claim 1, wherein performing the data augmentation on at least the portion of the first high-resolution image comprises performing one or more operations on at least the portion of the first high-resolution image, the one or more operations comprises randomly zooming, shifting horizontally, shifting vertically, flipping horizontally, randomly rotating, changing brightness, cropping and resizing.

4. The method of claim 1, wherein the pre-stored homomorphic encrypted second feature vector corresponding to the second biometric sample associated with the user is stored by:

acquiring the second biometric sample comprising at least the portion of a second high-resolution image of the biometric modality of the user during an enrollment phase;

obtaining the second feature vector corresponding to the at least the portion of the second high-resolution image;

encrypting, using Fully Homomorphic Encryption, the second feature vector using the public key stored at the first computation device to obtain an encrypted second feature vector;

obtaining an encrypted reduced dimensionality second feature vector corresponding to the encrypted second feature vector, wherein the encrypted reduced dimensionality second feature vector is obtained by performing a homomorphic operation of the encrypted second feature vector with an encrypted random projection matrix encrypted using Fully Homomorphic Encryption, the encrypted random projection matrix pre-assigned to the user, and wherein the encrypted random projection matrix is encrypted using the public key; and sharing the encrypted reduced dimensionality second feature vector with the second computation device.

5. The method of claim 1, wherein obtaining the matching score between the encrypted reduced dimensionality first feature vector and the homomorphic encrypted second feature vector comprises:

packing the encrypted reduced dimensionality first feature vector in a first ciphertext and the homomorphic encrypted second feature vector in a second ciphertext;

multiplying, elementwise, the first ciphertext with the second ciphertext to obtain a resultant vector;

rotating the resultant vector log(n) times to obtain a plurality of rotated resultant vectors; and computing a sum of the plurality of rotated resultant vectors to obtain an inner product of the encrypted reduced dimensionality first feature vector and the homomorphic encrypted second feature vector, wherein the inner product represents the matching score between the encrypted reduced dimensionality first feature vector and the homomorphic encrypted second feature vector.

6. The method of claim 1, wherein the first high-resolution image is acquired during a verification phase of the biometric verification.

7. The method of claim 1, further comprising sharing, with the second device, the public key, encrypted random projection matrix, and a unique identifier (ID) associated with the user.

8. The method of claim 1, wherein the public key and the private key are associated with the user.

9. The method of claim 1, wherein the first computation device is a client device and the second computation device is a server device.

10. A system for biometric verification comprising:

one or more memories; and one or more hardware processors, the one or more memories coupled to the one or more hardware processors, wherein the one or more hardware processors are configured to execute programmed instructions in a trusted execution environment (TEE), the programmed instructions stored in the one or more memories, to:

acquire a first biometric sample, the first biometric sample comprising at least a portion of a first high-resolution image of a biometric modality of a user;

perform data augmentation on at least the portion of the first high resolution image to obtain a set of augmented image portions of the first biometric sample;

obtain a set of first feature vectors corresponding to the set of augmented image portions and the first high resolution image;

encrypt, using Fully Homomorphic Encryption, each first feature vector of the set of first feature vectors using a public key stored at a first computation device to obtain a set of first encrypted feature vectors;

obtain a set of encrypted reduced dimensionality first feature vectors corresponding to the set of encrypted first feature vectors, wherein an encrypted reduced dimensionality first feature vector from amongst the set of encrypted reduced dimensionality first feature vectors corresponding to an encrypted first feature vector from amongst the set of encrypted first feature vector is obtained by performing a homomorphic operation of the encrypted feature vector with an encrypted random projection matrix encrypted using Fully Homomorphic Encryption, and wherein the encrypted random projection matrix is pre-assigned to the user and encrypted using the public key;

share the set of encrypted reduced dimensionality first feature vectors with a second computation device, wherein the set of encrypted reduced dimensionality feature vectors are compared with a pre-stored homomorphic encrypted second feature vector corresponding to a second biometric sample associated with the user to obtain a set of matching scores, wherein a matching score between an encrypted reduced dimensionality first feature vector of the set of encrypted reduced dimensionality first feature vectors and the homomorphic encrypted second feature vector is indicative of an extent of matching between the first biometric sample and the second biometric sample, and wherein each matching score of the set of encrypted matching scores is encrypted via homomorphic encryption using the public key;

receive, from the second device, the set of encrypted matching scores and decrypting the set of encrypted matching scores using a private key; and verify the user based on a comparison of the set of matching scores with a predetermined threshold score.

11. The system of claim 10, wherein to acquire the first biometric sample, the one or more hardware processors are configured by the instructions to:

capture the first high resolution image of at least one biometric modality of the user; and segment the first high resolution image to obtain the first biometric sample.

12. The system of claim 11, wherein the public key and the private key are associated with the user.

13. The system of claim 11, wherein the first computation device is a client device.

14. The system of claim 11, wherein the second computation device is a server device.

15. The system of claim 10, wherein to perform the data augmentation on the at least portion of the first high resolution image, the one or more hardware processors are configured by the instructions to perform one or more operations on at least the portion of the first high resolution image, the one or more operations comprises randomly zooming, shifting horizontally, shifting vertically, flipping horizontally, randomly rotating, changing brightness, cropping and resizing.

16. The system of claim 10, wherein to store the pre-stored homomorphic encrypted second feature vector corresponding to the second biometric sample associated with the user, the one or more hardware processors are configured by the instructions to:

acquire the second biometric sample comprising at least the portion of a second high-resolution image of the biometric modality of the user during an enrollment phase;

obtain the second feature vector corresponding to the at least the portion of the second high-resolution image;

encrypt, using Fully Homomorphic Encryption, the second feature vector using the public key stored at the first computation device to obtain an encrypted second feature vector;

obtain an encrypted reduced dimensionality second feature vector corresponding to the encrypted second feature vector, wherein the encrypted reduced dimensionality second feature vector is obtained by performing a homomorphic operation of the encrypted second feature vector with an encrypted random projection matrix encrypted using Fully Homomorphic Encryption, the encrypted random projection matrix pre-assigned to the user, and wherein the encrypted random projection matrix is encrypted using the public key; and share the encrypted reduced dimensionality second feature vector with the second computation device.

17. The system of claim 10, wherein to obtain the matching score between the encrypted reduced dimensionality first feature vector and the homomorphic encrypted second feature vector, the one or more hardware processors are configured by the instructions to:

pack the encrypted reduced dimensionality first feature vector in a first ciphertext and the homomorphic encrypted second feature vector in a second ciphertext;

multiply, elementwise, the first ciphertext with the second ciphertext to obtain a resultant vector;

rotate the resultant vector $\log(n)$ times to obtain a plurality of rotated resultant vectors; and compute a sum of the plurality of rotated resultant vectors to obtain an inner product of the encrypted reduced dimensionality first feature vector and the homomorphic encrypted second feature vector, wherein the inner product represents the matching score between the encrypted reduced dimensionality first feature vector and the homomorphic encrypted second feature vector.

18. The system of claim 10, wherein the first high resolution image is acquired during a verification phase of the biometric verification.

19. The system of claim 10, wherein the one or more hardware processors are further configured by the instructions to share, with the second device, the public key, encrypted random projection matrix, and a unique identifier (ID) associated with the user.

20. One or more non-transitory machine readable information storage mediums comprising one or more instructions which when executed by one or more hardware processors cause:

acquiring, via one or more hardware processors, a first biometric sample, the first biometric sample comprising at least a portion of a first high-resolution image of a biometric modality of a user;

performing, via the one or more hardware processors, data augmentation on at least the portion of the first high-resolution image to obtain a set of augmented image portions of the first biometric sample;

obtaining a set of first feature vectors corresponding to the set of augmented image portions and the first high resolution image, via the one or more hardware processors;

encrypting, using Fully Homomorphic Encryption, each first feature vector of the set of first feature vectors using a public key stored at a first computation device to obtain a set of first encrypted feature vectors, via the one or more hardware processors;

obtaining, via the one or more hardware processors, a set of encrypted reduced dimensionality first feature vectors corresponding to the set of encrypted first feature vectors, wherein an encrypted reduced dimensionality first feature vector from amongst the set of encrypted reduced dimensionality first feature vectors corresponding to an encrypted first feature vector from amongst the set of encrypted first feature vector is obtained by performing a homomorphic operation of the encrypted feature vector with an encrypted random projection matrix encrypted using Fully Homomorphic Encryption and, and wherein the encrypted random projection matrix is pre-assigned to the user and is encrypted using the public key;

sharing, via the one or more hardware processors, the set of encrypted reduced dimensionality first feature vectors with a second computation device, wherein the set of encrypted reduced dimensionality feature vectors are compared with a pre-stored homomorphic encrypted second feature vector corresponding to a second biometric sample associated with the user to obtain a set of matching scores, wherein a matching score between an encrypted reduced dimensionality first feature vector of the set of encrypted reduced dimensionality first feature vectors and the homomorphic encrypted second feature vector is indicative of an extent of matching between the first biometric sample and the second biometric sample, and wherein each matching score of the set of encrypted matching scores is encrypted via homomorphic encryption using the public key;

receiving, from the second device, the set of encrypted matching scores and decrypting the set of encrypted matching scores using a private key, via the one or more hardware processors; and verifying the user based on a comparison of the set of matching scores with a predetermined threshold score, via the one or more hardware processors.

* * * * *